Figure 1:
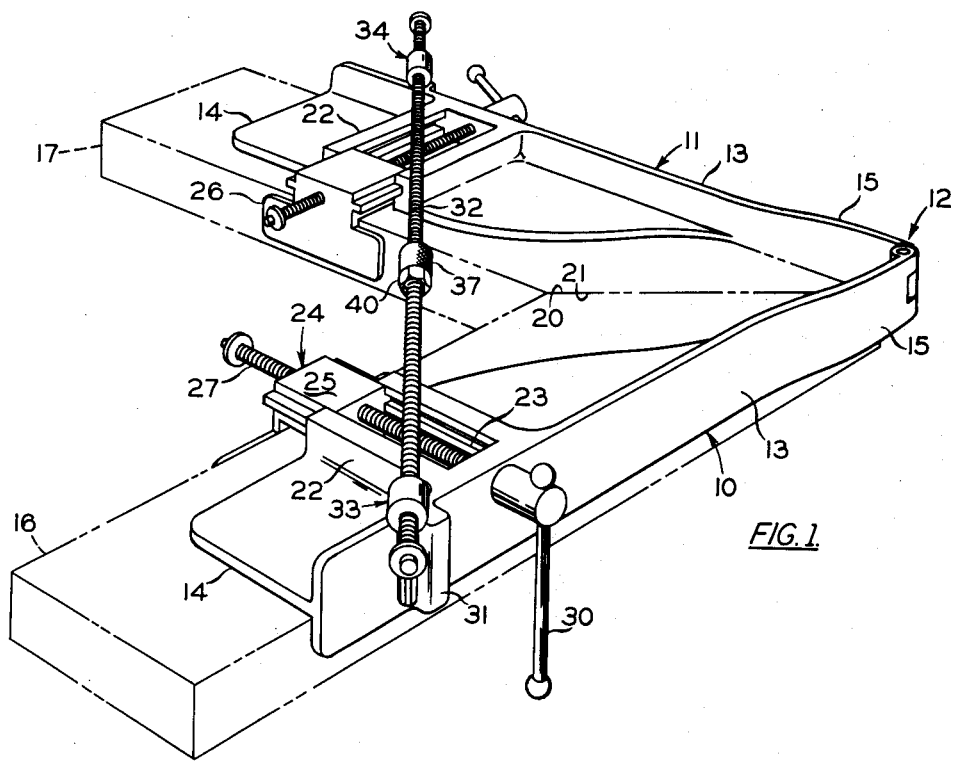

June 16, 1964     J. J. DUSSOLD     3,137,492

MITER CLAMP

Filed Dec. 8, 1961

*INVENTOR.*
JOHN J. DUSSOLD
BY *Cohn and Powell*
ATTORNEY.

United States Patent Office 3,137,492
Patented June 16, 1964

3,137,492
MITER CLAMP
John J. Dussold, 1033 Geyer Ave., St. Louis 4, Mo.
Filed Dec. 8, 1961, Ser. No. 158,176
5 Claims. (Cl. 269—41)

This invention relates generally to improvements in a clamping device, and more particularly to improvements in a miter clamp for holding workpieces in desired relation while the workpieces are being permanently secured together.

An important object of the present invention is to provide a miter clamp that acts to hold the abutting margins forming the joint together under a compressive pressure so as to realize greater strength in such joint.

Another important objective is provided by a pair of arms that are pivotally connected, the arms positioning the workpieces and cooperating upon relative hinging movement to accommodate any desired angle as determined by the abutting margins of the joint. Each arm is provided with a clamp for rigidly securing its associated workpiece.

Still another important objective is achieved by the provision of a separable pressure-applying mechanism that is selectively utilized to place the miter joint under a compressive pressure. This mechanism operatively interconnects the pivoted arms so as to exert a force substantially at right angles to the plane of the joint which tends to urge the arms toward each other. Because the workpieces are secured to the arms, the result is an application of pressure between the abutting margins.

Yet another important objective is afforded by constructing the separable pressure-applying unit of a pair of jaw elements threadedly connected to a rod that extends across the arms, the jaw elements selectively engaging shoulders on the arms. The threaded connection of the jaw elements and the rod causes movement of the jaw elements toward each other upon rotation of the rod in one direction and causes movement away from each other upon rotation of the rod in the opposite direction, thereby adjusting the degree of compressive pressure exerted on the glue joint.

Other important advantages are realized by placing a manipulating means on the rod between the threadedly connected jaw elements which facilitates rotation of the rod in either direction.

Another important objective is achieved by the structural arrangement of the arms and their associated clamps which enables the outermost corner of the joint to be located close to yet spaced from the axis of the pivot means, and the structural arrangement of the separable pressure-applying unit relative to the arms and workpieces such that the transverse rod is spaced inwardly of the innermost corner of the glue joint. When the workpieces are clamped to the arms in a position in which their outermost corners contact while their innermost corners are only slightly spaced apart, the pressure-applying unit assures that all portions of the joint are compressed upon closing the arms about the pivot means.

It is an important objective to provide a miter clamp that is simple and durable in construction, economical to manufacture and assemble, efficient in operation, and which can be utilized by anyone with only a minimum of instruction.

Figure 3:
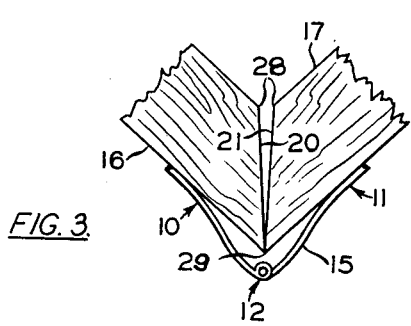
Figure 2:
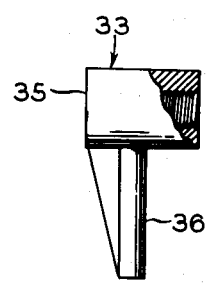
Figure 4:
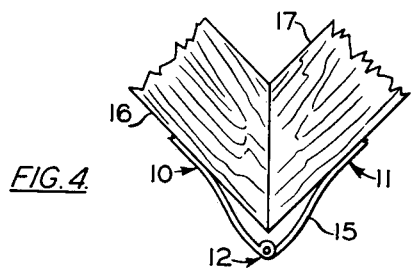

The foregoing and numerous other objects and advantages of the invention will more clearly appear from the following detailed description of a preferred embodiment, particularly when considered in connection with the accompanying drawing, in which:

FIG. 1 is a perspective view of the miter clamp;
FIG. 2 is an enlarged side elevational view, partly in cross section, of one of the jaw elements of the pressure-applying unit;
FIG. 3 is a top plan view of the miter clamp at the pivot connection, showing the arms slightly opened, and
FIG. 4 is a top plan view, similar to FIG. 3, but showing the arms closed so that the abutting margins of the workpieces form a joint.

Referring now by characters of reference to the drawing, and first to FIG. 1, it is seen that the miter clamp includes a pair of arms generally indicated at 10 and 11 which are hinged together by a hinge 12 constituting a pivot means. Each of the arms 10 and 11 consists of a substantially vertical wall 13 and an integral substantially horizontal wall 14. The horizontal walls 14 extend inwardly toward each other from a point substantially midway of their associated vertical walls 13 so that portions of the vertical walls extend above and below the horizontal walls 14. For reasons which will appear later, each of the vertical walls 13 is provided with an outwardly offset portion 15 immediately adjacent the hinge 12. With this structure, the hinge 12 is slightly spaced from the point of intersection of the planes of the vertical walls 13.

A pair of workpieces 16 and 17 are retained and positioned respectively by the arms 10 and 11 so that their mating inclined margins 20 and 21 are held in abutment incident to forming a glue joint. Specifically, each of the workpieces 16 and 17 is disposed underneath the horizontal wall 14 of its associated arm 10 and 11 so that its outside margin engages the lower portion of the vertical wall 13.

The arms 10 and 11 can be swung open or closed about the hinge 12 so that the margins 20 and 21 abut. In order to provide a more effective distribution of pressure between the abutting margins 20 and 21 upon utilization of this particular miter clamp, the outermost corners 29 of the joint are moved into engagement close to yet slightly spaced from the hinge 12 as is best shown in FIG. 3, while the innermost corners 28 are maintained in a slightly spaced relationship. The workpieces 16 and 17 are then rigidly clamped to the arms 10 and 11.

Formed integrally with each of the arms 10 and 11 is a guideway 22 having an internal track 23. The guideways 22 open inwardly of the arms 10 and 11.

Slidably disposed in the track 23 of each guideway 22 is a cooperating clamp 24. As is best seen in FIG. 1, each of the clamps 24 includes a body 25 having laterally extending projections that are slidably received in the track 23 of guideway 22, and includes integral depending plate 26 that is adapted to engage the inside margin of its associated workpiece.

A rod 27 is threadedly connected to the body 25 of clamp 24 and is journalled for rotation in the vertical wall 13. A handle 30 is connected to the outermost end of shaft 27 and is adapted to rotate the shaft 27 to cause longitudinal movement of the clamp 24. After the workpieces 16 and 17 are located relative to each other as explained previously, the clamps 24 are moved against the inside margins of the workpieces by actuating the shaft handles 30. The clamps 24 travel along the threaded shafts 27 so that the workpieces 16 and 17 are rigidly secured between the depending plates 26 and the lowermost portions of vertical walls 13. When secured in this manner, the workpieces 16 and 17 cannot be unintentionally moved relative to the arms 10 and 11 respectively.

Each of the arms 10 and 11 is provided with a substantially vertical abutment 31 on the outermost face of the vertical wall 13. In the embodiment disclosed, each abutment 31 is located substantially at the end of its associated arm opposite the hinge 12.

Interconnecting the arms 10 and 11 is a pressure-applying mechanism that includes a threaded rod 32. Carried on rod 32 are a pair of jaw elements 33 and 34. From FIG. 2, it is seen that each of the jaw elements consists of a cylindrical body 35 threadedly connected to the rod 32 and a depending shoulder 36 adapted to engage and interfit the corner provided between the vertical wall 13 and its associated abutment 31.

Provided centrally of rod 32 is an integral knurled knob 37 that can be conveniently gripped for rotating the rod 32 in either direction and a nut 40 formed integrally at one end of knob 37 that can be turned with a wrench.

The threads on rod 32 at opposite sides of the center manipulating means provided by knob 37 and nut 40 are relatively reversed so that upon rotation of rod 32 in one direction, the jaw elements 33 and 34 will move toward each other while rotation of the rod in the opposite direction will move the jaw elements 33 and 34 away from each other, assuming that such jaw elements 33 and 34 are held from relative rotation as for example by engagement with the abutments 31.

Moreover, it will be noted that the relative arrangement of the abutments 31 and jaw elements 33 and 34 causes the rod 32 to extend between the arms 10 and 11 along a transverse axis substantially at right angles to the vertical plane of the joint formed by workpieces 16 and 17. Furthermore, it will be noted that the rod 32 extends longitudinally along an axis spaced inwardly from the innermost corners 28 of such joint.

To apply transverse pressure on the joint, the jaw elements 33 and 34 are fitted or slid into engagement with the abutments 31 formed respectively on arms 10 and 11. Then the manipulating means provided by knob 37 and/or nut 40 is utilized to turn the rod 32 in a direction so that the jaw elements 33 and 34 move relatively toward each other along the threaded rod 32, thereby tending to urge the arms 10 and 11 toward each other. This action places a compressive force between the abutting margins 20 and 21 of the workpieces. Of course, to release this compressive force, the rod 32 is turned in the opposite direction which causes the jaw elements 33 and 34 to move relatively away from each other sufficiently to permit easy disengagement of the jaw elements 33 and 34 from their respective abutments 31. The rod 32 and the jaw elements 33 and 34 can then be lifted as a unit from the arms.

It is thought that the operation and functional advantages of the miter clamp have become fully apparent from the foregoing detailed description of parts, but for completeness of disclosure the formation of a miter joint will be briefly set forth. It will be assumed that the pressure-applying mechanism is disconnected from the arms 10 and 11 to permit such arms to be swung freely about hinge 12, and it will be assumed that the clamps 24 are moved outwardly a sufficient distance to accommodate the width of the workpieces 16 and 17 involved.

First, the workpieces 16 and 17 are placed in position respectively to arms 10 and 11 with the margins 20 and 21 to be joined located in a manner so that such margins abut in the region of the hinge 12. As stated previously, the arms 10 and 11 are opened sufficiently to allow the outermost corners 29 of the joint to engage while the innermost corners 28 are spaced only slightly apart as is shown best in FIG. 3. Then clamps 24 are moved inwardly against the workpieces 16 and 17 by manipulation of handles 30. The workpieces are clamped securely between the lower portions of vertical walls 13 and the depending plates 26 of clamps 24.

The arms 10 and 11 then can be swung outwardly about hinge 12 to move the margins 20 and 21 apart and thereby enable glue to be applied to such margins. After the glue is applied, the arms 10 and 11 are swung toward each other until the margins 20 and 21 abut to form a joint. Because of the particular positioning of the workpieces 16 and 17 as described above, there still may remain a very slight spacing of the innermost corners 28 of such joint.

At this stage, the separate pressure-applying mechanism is attached. The depending portions 36 of the jaw elements 33 and 34 are placed into engagement with the abutments 31 and the respective arms 10 and 11. Then the rod 32 is turned in a direction by gripping the knob 37 and/or the nut 40 so that the jaw elements 33 and 34 move relatively toward each other. This action of the jaw elements 33 and 34 tends to move the arms 10 and 11 toward each other and thereby creates a compressive force between the abutting margins 20 and 21.

It will be noted that the outermost corners 29 of the joint, which are initially in engagement, are moved tightly under compression. The innermost corners 28 of the joint, which were initially only very slightly spaced apart, are moved into engagement and compressed upon application of the transverse force between the arms through the rod 32. Thus it is seen that the entire length of the joint is placed under a compressive force which enhances the strength of the glue joint.

After the glue joint is formed, the miter clamp is removed. First, the pressure-applying mechanism is separated by turning the rod 32 in the opposite direction so that the jaw elements 33 and 34 move relatively away from each other sufficiently to enable disengagement from abutments 31. Then the clamps 24 are moved out of engagement with the workpieces 16 and 17 upon manipulation of the handles 30. The arms 10 and 11 can then be simply lifted from the workpieces 16 and 17.

Although the invention has been described by making detailed reference to a single preferred embodiment, such detail is to be understood in an instructive, rather than in any restrictive sense, many variants being possible within the scope of the claims hereunto appended.

I claim as my invention:

1. A clamping device for holding two workpieces in angular relationship with margins in abutment to form a joint, the device comprising:
   (a) a pair of arms,
   (b) pivot means interconnecting said arms,
   (c) means carried by said arms for clamping said workpieces to said arms so that said margins abut in a predetermined angular relationship of said arms,
   (d) each arm being provided with a shoulder facing outwardly,
   (e) a rod extending between said arms, and
   (f) means carried by said rod detachably engaging said shoulders, the last said means being connected to the rod so as to exert a pressure tending to close said arms upon adjustment of said rod, whereby to exert a transverse compressive pressure on the abutting margins of said workpieces.

2. A clamping device for holding two workpieces in angular relationship with margins in abutment to form a joint, the device comprising:
   (a) a pair of arms,
   (b) pivot means interconnecting said arms,
   (c) means carried by said arms for clamping said workpieces to said arms so that said margins abut in a predetermined angular relationship of said arms,
   (d) each arm being provided with a shoulder facing outwardly,
   (e) a rod extending between said arms,
   (f) a traveling element threadedly attached to each end of said rod, said traveling elements interfitting behind and engaging selectively said shoulders, and
   (g) means on said rod to facilitate turning the rod to adjust the position of said traveling elements on said rod,
   (h) said traveling elements and rod being threadedly connected so that rotation of the rod in one direction will move the traveling elements along the rod toward each other while rotation of the rod in the opposite direction will move the traveling elements along the rod away from each other, said traveling elements exerting a pressure tending to close said arms upon adjustment of said rod in one direction whereby to exert a transverse compressive pressure on the abutting margins of said workpieces.

3. A clamping device for holding two workpieces in angular relationship with margins in abutment to form a joint, the device comprising:
   (a) a pair of arms,
   (b) pivot means interconnecting said arms,
   (c) means carried by said arms for clamping said workpieces to said arms so that said margins abut in a predetermined angular relationship of said arms,
   (d) a detachable pressure means interconnecting said arms and including a rod extending between said arms,
   (e) elements carried by said rod and selectively engaging said arms, at least one element being threadedly attached to the rod, and
   (f) means between said elements for turning said rod so as to adjust the relative position of said elements along said rod and thereby adjust the transverse compressive pressure on the abutting margins of said workpieces.

4. A clamping device for holding two workpieces in angular relationship with margins in abutment to form a joint, the device comprising:
   (a) a pair of arms,
   (b) pivot means interconnecting said arms,
   (c) means carried by said arms for clamping said workpieces to said arms so that said margins abut in a predetermined angular relationship of said arms with the outer corner of said joint located close to yet spaced from said pivot means,
   (d) a separable pressure means interconnecting said arms including a rod extending between said arms and spaced inwardly of the inside corner of said joint,
   (e) elements carried by said rod and selectively engaging said arms, at least one of said elements threadedly engaging said rod, and
   (f) means for turning said rod so as to adjust the relative position of said elements along said rod and thereby adjust the transverse compressive pressure on the abutting margins of said workpieces.

5. A clamping device for holding two workpieces in angular relationship with margins in abutment to form a joint, the device comprising:
   (a) a pair of arms,
   (b) pivot means interconnecting said arms,
   (c) each arm having a substantially vertical wall and an inwardly extending substantially horizontal wall, said walls being adapted to engage and position the said workpieces, the planes of said substantially vertical walls intersecting close to yet spaced from the said pivot means,
   (d) means carried by said arms for clamping said workpieces to said arms so that said margins abut in a predetermined angular relationship of said arms with the outer corner of said joint located close to yet spaced from said pivot means,
   (e) each arm being provided with a shoulder, said shoulders facing outwardly, and
   (f) a detachable pressure means interconnecting said arms including a pair of jaw elements each of which selectively engages one of said shoulders,
   (g) a rod extending between said jaw elements, said rod being located inwardly of the inside corner of said joint,
   (h) said jaw elements being threadedly connected to said rod so that said jaw elements are movable toward each other upon rotation of said rod in one direction and movable away from each other upon rotation of the rod in the other direction, and
   (i) means between said jaw elements for turning said rod so as to adjust the position of said jaw elements along said rod and thereby adjust the transverse compressive pressure on the abutting margins of said workpieces.

References Cited in the file of this patent
UNITED STATES PATENTS

| | | |
|---|---|---|
| 1,459,094 | French | July 19, 1923 |
| 1,704,893 | Harrison | Mar. 12, 1929 |
| 2,908,300 | Hahn | Oct. 13, 1959 |
| 2,941,557 | Baprawski | June 21, 1960 |